(12) United States Patent
Lin et al.

(10) Patent No.: US 7,965,364 B2
(45) Date of Patent: Jun. 21, 2011

(54) LIQUID CRYSTAL DISPLAY HAVING COMMON AND FLOATING ELECTRODES ON ONE OF SUBSTRATES THEREOF

(75) Inventors: Yu-Cheng Lin, Miao-Li (TW);
Chun-Yung Chi, Miao-Li (TW);
Chueh-Ju Chen, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 199 days.

(21) Appl. No.: 12/001,577

(22) Filed: Dec. 11, 2007

(65) Prior Publication Data

US 2008/0137018 A1 Jun. 12, 2008

(30) Foreign Application Priority Data

Dec. 11, 2006 (TW) ................................ 95146236 A

(51) Int. Cl.
*G02F 1/1343* (2006.01)

(52) U.S. Cl. ........................................ 349/141; 349/139

(58) Field of Classification Search .................. 349/141, 349/143, 139
See application file for complete search history.

(56) References Cited

U.S. PATENT DOCUMENTS

| | | | | |
|---|---|---|---|---|
| 5,953,092 A * | 9/1999 | Sung et al. | ..................... | 349/143 |
| 6,005,650 A * | 12/1999 | Kim et al. | ..................... | 349/130 |
| 6,111,627 A * | 8/2000 | Kim et al. | ..................... | 349/141 |
| 6,271,903 B1 * | 8/2001 | Shin et al. | ..................... | 349/110 |
| 6,323,927 B1 | 11/2001 | Hiroshi | | |
| 6,784,966 B2 * | 8/2004 | Maeda et al. | ................. | 349/141 |
| 7,113,243 B2 * | 9/2006 | Jeong et al. | ................. | 349/141 |
| 7,369,204 B1 * | 5/2008 | Choi et al. | ..................... | 349/141 |
| 7,535,534 B2 | 5/2009 | Lee et al. | | |
| 2002/0176043 A1 * | 11/2002 | Fukami et al. | ................. | 349/141 |
| 2004/0125251 A1 * | 7/2004 | Kim | ............................. | 349/43 |
| 2004/0263749 A1 | 12/2004 | Jeong et al. | | |
| 2005/0052603 A1 * | 3/2005 | Jin | .............................. | 349/141 |
| 2008/0137018 A1 * | 6/2008 | Lin et al. | ..................... | 349/141 |

FOREIGN PATENT DOCUMENTS

CN 1591142 A 3/2005

\* cited by examiner

*Primary Examiner* — Dung T. Nguyen

(74) *Attorney, Agent, or Firm* — Wei Te Chung

(57) ABSTRACT

An exemplary liquid crystal display (LCD) (200) includes a first substrate (210); a second substrate (230) opposite to the first substrate; a liquid crystal layer (250) sandwiched between the first substrate and the second substrate; a first common electrode (211), a first insulating layer (212), and pixel electrodes provided at an inner surface of the first substrate in that order; and second common electrodes (231) and floating electrodes (233) provided at the second substrate. The first common electrode and the pixel electrodes, and the second common electrodes and the floating electrodes, respectively produce two electric fields in the liquid crystal layer corresponding to each other. A combined electric field strength is uniformly distributed in the liquid crystal layer, so that all the liquid crystal molecules can be sufficiently twisted. Thus a viewing angle, a degree of chroma, and a transmission ratio of the LCD are improved.

20 Claims, 8 Drawing Sheets

LIQUID CRYSTAL DISPLAY HAVING COMMON AND FLOATING ELECTRODES ON ONE OF SUBSTRATES THEREOF

FIELD OF THE INVENTION

The present invention relates to liquid crystal displays, and particularly to a liquid crystal display having a plurality of common and floating electrodes on one of substrates thereof.

GENERAL BACKGROUND

A liquid crystal display (LCD) utilizes the optical and electrical anisotropy of liquid crystal molecules to produce an image. The liquid crystal molecules have a particular passive orientation when no voltage is applied thereto. However, in a driven state, the liquid crystal molecules change their orientation according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, an orientation of the liquid crystal molecules is changed and a desired image can be produced.

The first type of LCD developed was the TN (twisted nematic) mode LCD. Even though TN mode LCDs have been put into use in many applications, they have an inherent drawback that cannot be eliminated; namely, a very narrow viewing angle. By adding compensation films on TN mode LCDs, this problem can be mitigated to some extent. However, the cost of the TN mode LCD is increased. Therefore, a totally different driving means called IPS (in-plane switching) was proposed as early as 1974. Then in 1993, Hitachi Corporation filed its first US patent application concerning IPS, in which an IPS mode LCD was disclosed. Then In 2000, an improved driving means called FFS (fringe field switching) was proposed. The FFS is similar to the IPS except its first common electrode.

Referring to FIG. 9, a typical FFS LCD 100 includes a first substrate 110, a second substrate 130 opposite and parallel to the first substrate 110, a liquid crystal layer 150 sandwiched between the first and second substrates 110.

The FFS LCD 100 further includes a common electrode 111 formed at an inner surface of the first substrate 110 facing the liquid crystal layer 150, an insulating layer 112 covering the common electrode 111, a plurality of parallel pixel electrodes 113 formed on the insulating layer 112, a first alignment layer 114 covering the pixel electrodes 113, and a first polarizer 115 formed at an outer surface of the first substrate 110 far from the liquid crystal layer 150.

The FFS LCD 100 further includes a color filter 132 and a second alignment layer 134 disposed between the second substrate 130 and the liquid crystal layer 150, in that order from top to bottom, a second polarizer 135 formed at an outer surface of the second substrate 130 far from the liquid crystal layer 150. At least one of the substrates 110, 130 is made from a transparent material, such as glass. Original rubbing directions of the alignment layers 114, 134 are parallel to each other, and are identical to a polarizing axis of the polarizer 115. The pixel electrodes 113 and the common electrode 111 are made of the transparent material selected from the group consisting of ITO (Indium-Tin Oxide) and IZO (Indium-Zinc Oxide).

When no voltage is applied to the common electrode and pixel electrodes 111, 113, the long axes of the liquid crystal molecules is in the rubbing direction of the alignment layers. Because the rubbing direction of the alignment layers 114, 134 is the same as the polarizing axis of the polarizer 115, light beams passing through the polarizer 115 can pass through the liquid crystal layer 150, and polarizing directions of the light beams do not change. Because the polarizing axes of the polarizers 115, 135 are perpendicular to each other, the light beams cannot pass through the polarizer 135, and are absorbed by the polarizer 135. Thus the FFS LCD 100 is in an "off" state, and cannot display images.

As shown in FIG. 10, when a voltage is applied to the common electrode and pixel electrodes 111, 113, an electric field 120 is generated between the common electrode and pixel electrodes 111, 113. A direction of the electric field 120 is parallel to the first substrate 110, and perpendicular to the pixel electrodes 113 and the common electrode 111. The long axes of the liquid crystal molecules twist to align in the direction of the electric field 120. When light beams pass through the liquid crystal layer 150, the polarization state of the light beams is converted to match the polarizing axis of the polarizer 135. Thus the light beams pass through the polarizer 135 to display images, and the FFS LCD 100 is in an "on" state.

However, because the common electrode 111 and the pixel electrode 113 are both disposed adjacent to the first substrate 110, and the liquid crystal layer 150 has a certain thickness, it is difficult for the electric field 120 between the common electrode and pixel electrodes 111, 113 to grasp those liquid crystal molecules that are distal from the first substrate 115. Thus such liquid crystal molecules cannot be readily or fully twisted to a predetermined angle in the electric field 120, such that a viewing angle, a degree of chroma, and a transmission ratio of the FFS LCD 100 are decreased.

Therefore, a new LCD that can overcome the above-described problems is desired.

SUMMARY

In a preferred embodiment, a liquid crystal display includes a first substrate; a second substrate opposite to the first substrate; a liquid crystal layer sandwiched between the first substrate and the second substrate; a first common electrode, a first insulating layer, and a plurality of pixel electrodes provided at an inner surface of the first substrate in that order; and a plurality of second common electrodes and floating electrodes provided at the second substrate.

Other advantages and novel features will become more apparent from the following detailed description when taken in conjunction with the accompanying drawings.

DETAILED DESCRIPTION OF PREFERRED EMBODIMENTS

Figure 1:
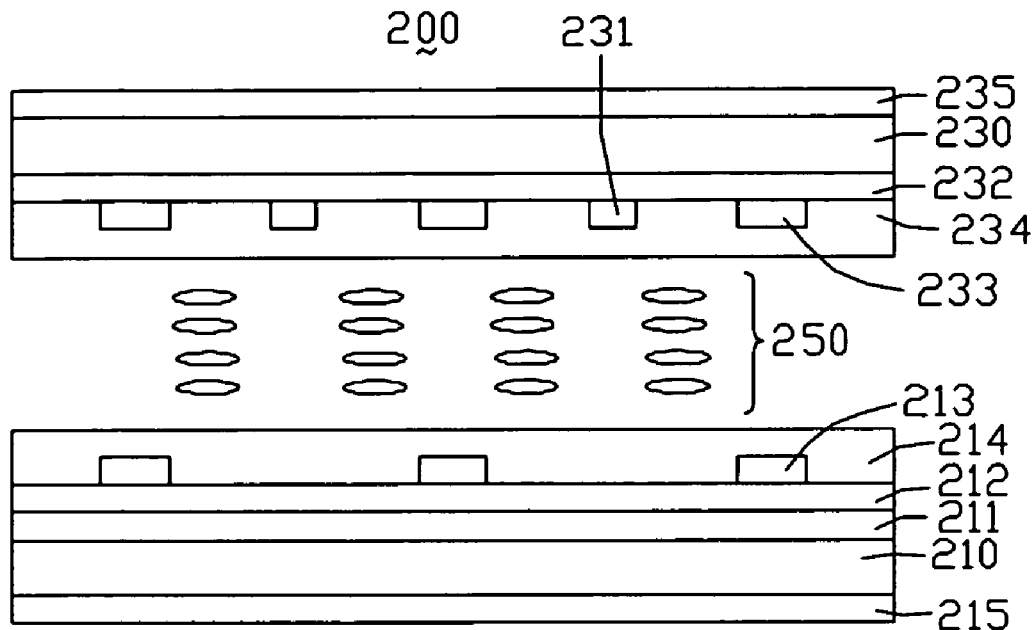
FIG. 1 is a schematic, side cross-sectional view of part of an FFS LCD according to a first embodiment of the present invention, the FFS LCD including pixel electrodes, common electrode, floating electrodes, and common electrodes.
Figure 2:
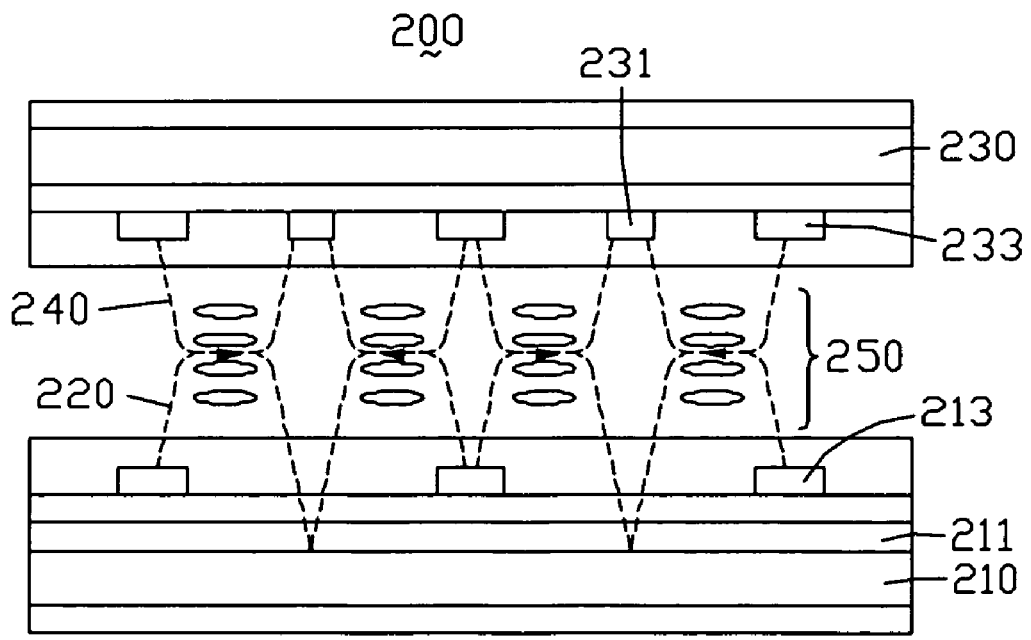
FIG. 2 is similar to FIG. 1, but showing the FFS LCD in an on state.

Referring to FIG. 1 and FIG. 2, an FFS LCD 200 according to a first embodiment of the present invention is shown. The FFS LCD 200 includes a first substrate 210, a second substrate 230 opposite and parallel to the first substrate 210, a liquid crystal layer 250 sandwiched between the first and second substrates 210, 230. The first and second substrates 210, 230 are made from a transparent material, such as glass or quartz. The liquid crystal layer 230 includes a plurality of nematic-type liquid crystal molecules.

The FFS LCD 100 further includes a first common electrode 211 formed at an inner surface of the first substrate 210 facing the liquid crystal layer 250, an insulating layer 212 covering the first common electrode 211, a plurality of pixel electrodes 213 formed on the insulating layer 212, a first alignment layer 214 covering the pixel electrodes 213, and a first polarizer 215 formed at an outer surface of the first substrate 210 far from the liquid crystal layer 250.

The FFS LCD 200 further includes a color filter 232 formed on an inner surface of the second substrate 230 facing the liquid crystal layer 250, a plurality of second common electrodes 231 and a plurality of floating electrodes 233 formed on the color filter 232, a second alignment layer 234 covering the second common electrodes 231 and the floating electrodes 233, and a second polarizer 235 formed at an outer surface of the second substrate 230 far from the liquid crystal layer 250. The pixel electrodes 213 are configured to receive a plurality of pixel voltages. The first common electrode 211 and the second common electrodes 231 are configured to receive a common voltage. The floating electrodes 233 are electrically floating.

Figure 3:
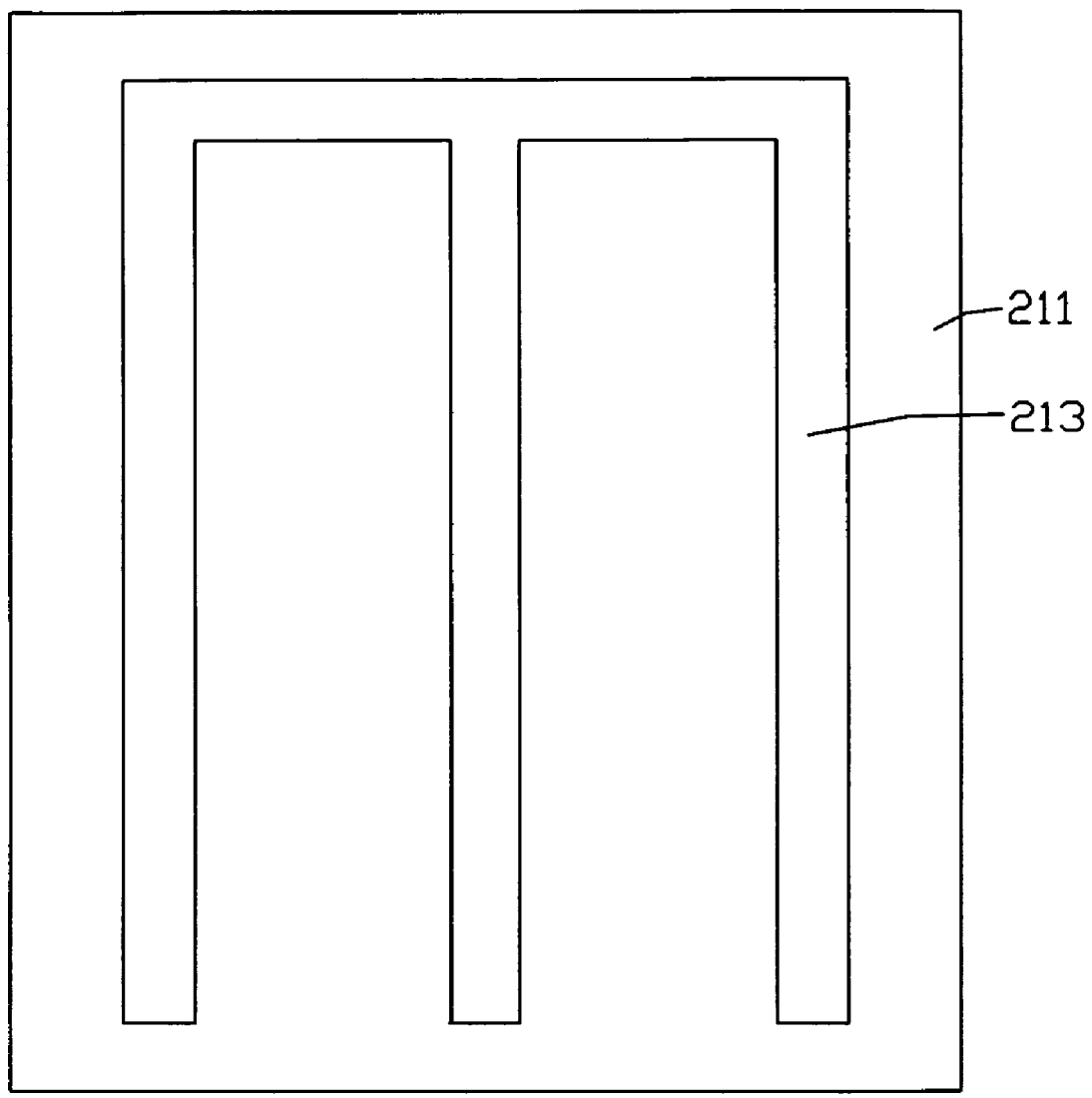
FIG. 3 is an enlarged, plan view of the pixel electrodes and the first common electrode of the FFS LCD of FIG. 1.
Figure 4:
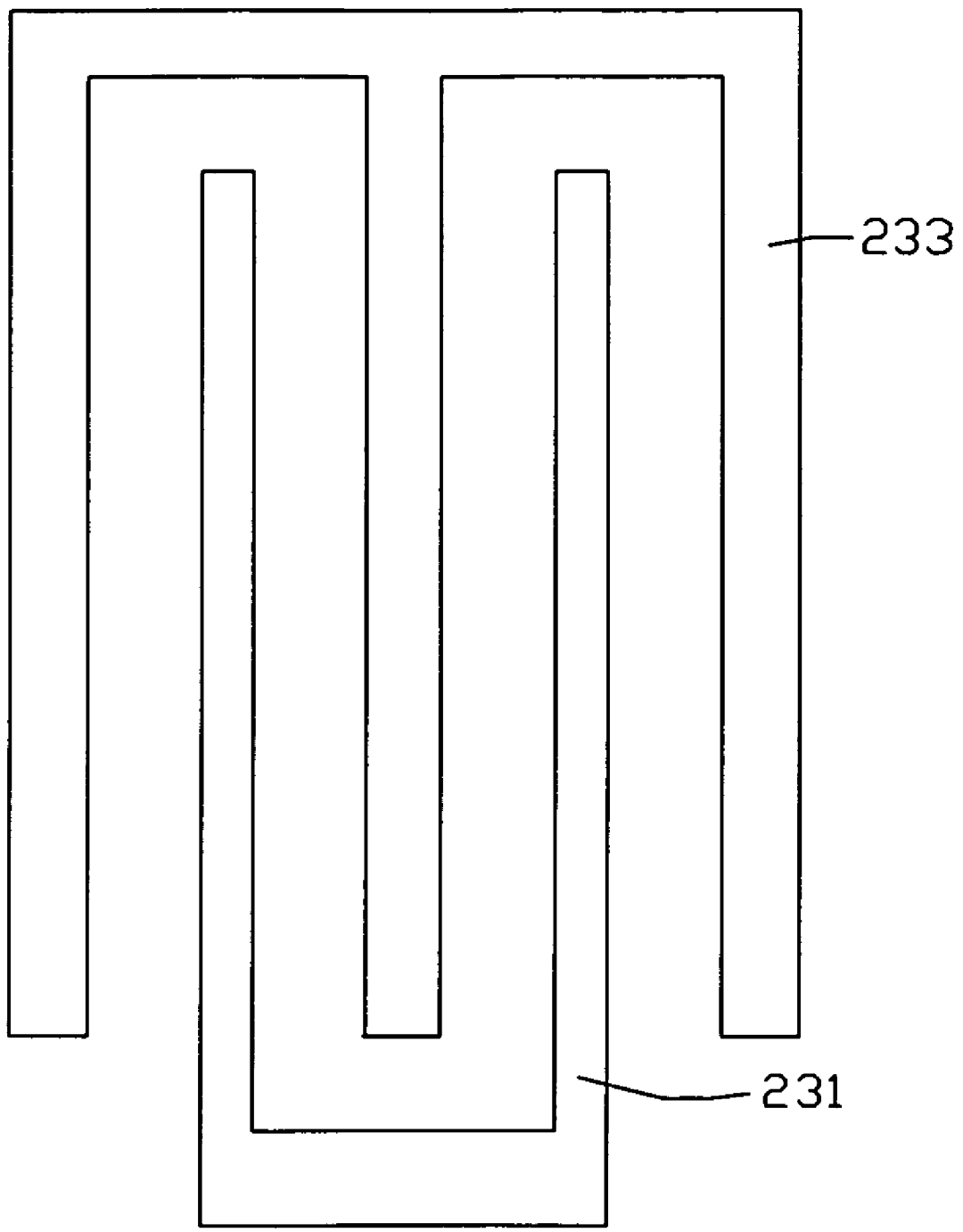
FIG. 4 is an enlarged, plan view of the floating electrodes and the second common electrodes of the FFS LCD of FIG. 1.

Referring to FIG. 3 and FIG. 4, the first common electrode 211 is plane-shaped. The pixel electrodes 213 are comb-shaped, and include a plurality of striped-shaped first teeth electrodes extending from a first straight bus line. The floating electrodes 233 are comb-shaped, and include a plurality of striped-shaped second teeth electrodes extending from a second straight bus line. The second common electrodes 231 are comb-shaped, and include a plurality of striped-shaped third teeth electrodes extending from a third straight bus line. The second common electrodes 231 and the floating electrodes 233 are alternately arranged in mesh. Each floating electrode 233 corresponds to a respective pixel electrode 213. Original rubbing directions of the alignment layers 214, 234 are parallel to each other, and are parallel to a polarizing axis of the first polarizer 215.

The pixel electrodes 213, the first common electrode 211, the second common electrodes 231 and the floating electrodes 233 are made of a transparent material selected from the group consisting of ITO (Indium-Tin Oxide) and IZO (Indium-Zinc Oxide). The second common electrodes 231 and the floating electrodes 233 are formed in the same layer by a semiconductor processing.

As shown in FIG. 2, when the pixel voltages are applied to the pixel electrodes 213 and the common voltage is applied to the first common electrode 211, a first electric field 220 is generated between the pixel electrodes 213 and the first common electrode 211. Thus, a plurality of electric charges are induced to be generated at a surface of the floating electrodes 233 located in the first electric field 220. Thus, a second electric field 240 is generated between the floating electrodes 233 and the second common electrodes 231. The first and second electric fields 220, 240 are substantially parallel to the first and second substrates 210, 230. Because the liquid crystal molecules have anisotropic properties, they are controlled by the first and second electric fields 220, 240, so that directions of long axes of the liquid crystal molecules conform to directions of the electric fields 220, 240. Those liquid crystal molecules distal from the first substrate 210 are driven more strongly by the electric field 240 produced by the floating electrodes 233 and the second common electrodes 231, and are driven relatively weakly by the electric field 220 produced by the pixel electrodes 213 and the first common electrode 211. Those liquid crystal molecules distal from the second substrate 230 are driven more strongly by the electric field 220 produced by pixel electrodes 213 and the first common electrode 211, and are driven relatively weakly by the electric field 240 produced by the floating electrodes 233 and the second common electrodes 231. That is, overall, the liquid crystal molecules of the liquid crystal layer 250 distributed along any given path normal to the first substrate 210 and the second substrate 230 are driven equally by the two electric fields 220, 240 acting cooperatively.

In summary, the pixel electrodes 213, the first common electrode 211, the second common electrodes 231 and the floating electrodes 233, produce two electric fields 220, 240 in the liquid crystal layer 250 corresponding to each other. A combined electric field strength is uniformly distributed in the liquid crystal layer 250, so that all the liquid crystal molecules can be sufficiently twisted. In particular, all the liquid crystal molecules in each of pixel regions defined by the electrodes 211, 213, 231, 233 can be sufficiently and uniformly twisted. That is, even those liquid crystal molecules distal from either of the substrates 210, 230 can be grasped by the combined electric fields 220, 240 produced by the electrodes 211, 213, 231, 233 and twisted to a predetermined angle. Thus a viewing angle, a degree of chroma, and a transmission ratio of the LCD 200 are improved.

Figure 5:
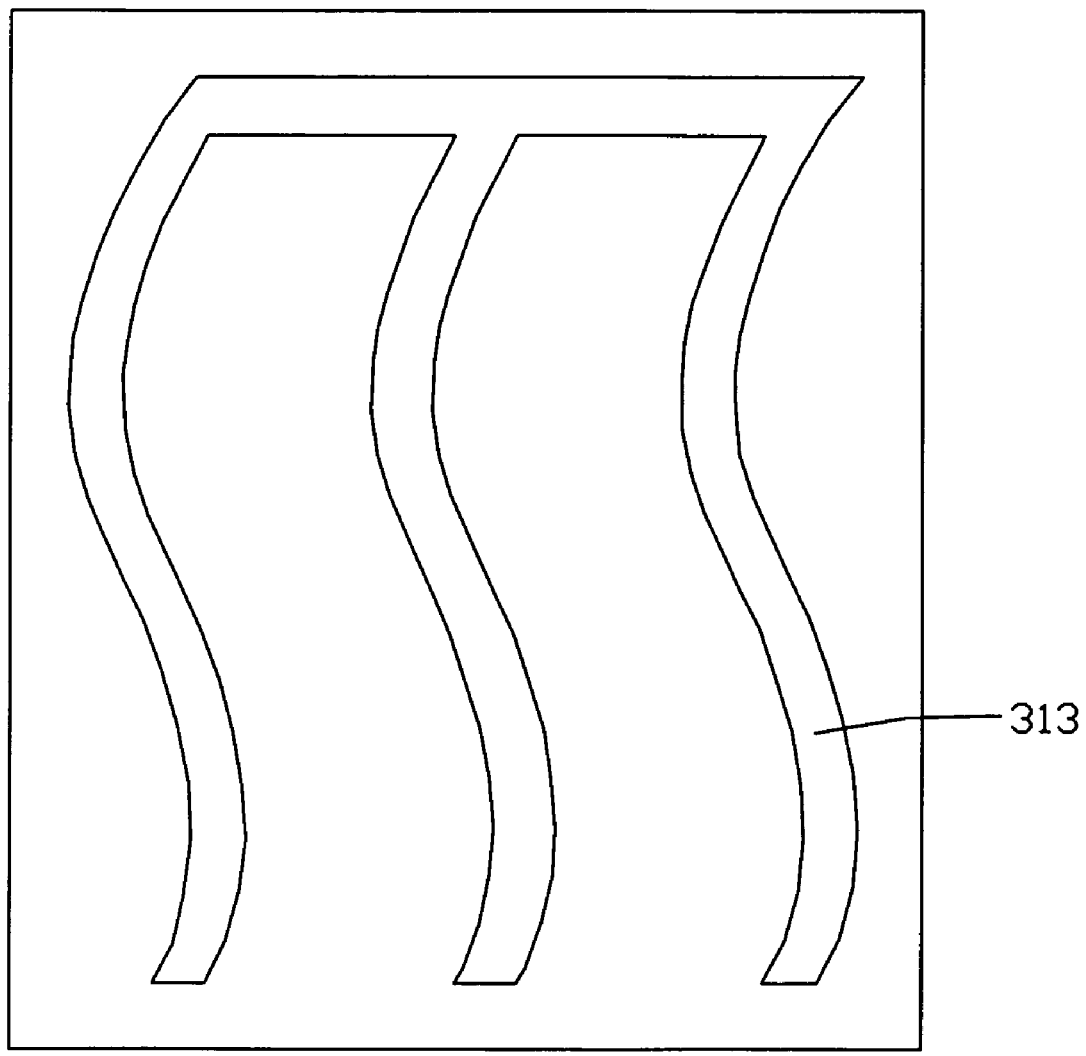
FIG. 5 is similar to FIG. 3, but showing a corresponding view in the case of pixel electrodes and a first common electrode of an FFS LCD according to a second embodiment of the present invention.

FIG. 5 shows pixel electrodes 313 of an LCD according to a second embodiment of the present invention. The pixel electrodes 313 are comb-shaped, and include a plurality of wavy-shaped teeth electrodes extending from a straight bus line.

Figure 6:
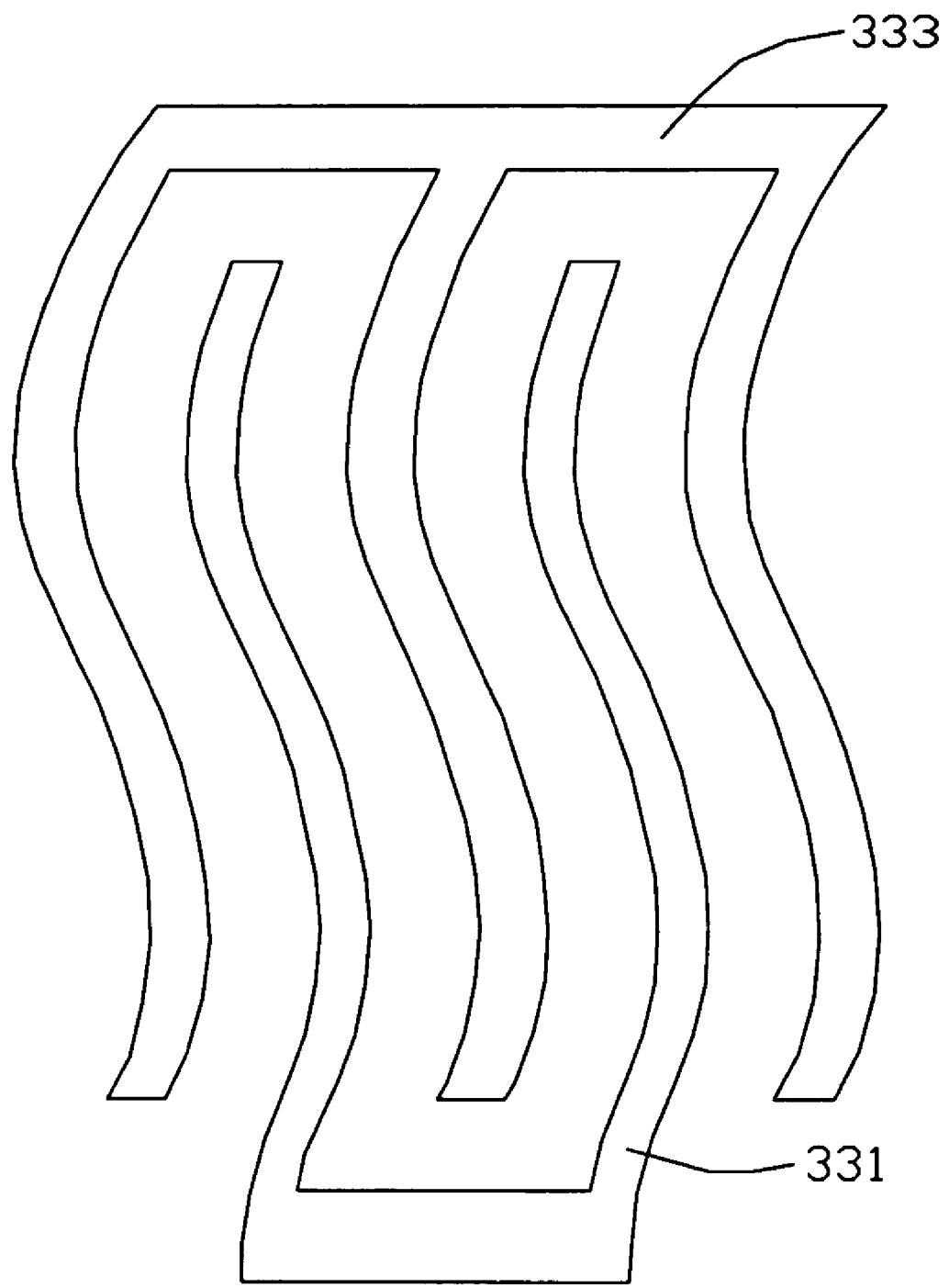
FIG. 6 is similar to FIG. 4, but showing a corresponding view in the case of floating electrodes and second common electrodes of an FFS LCD according to the second embodiment of the present invention.

FIG. 6 shows floating electrodes 333 and second common electrodes 331 of an LCD according to a second embodiment of the present invention. The floating electrodes 333 and the second common electrodes 331 are comb-shaped, and include a plurality of wavy-shaped teeth electrodes extending from a straight bus line.

Figure 7:
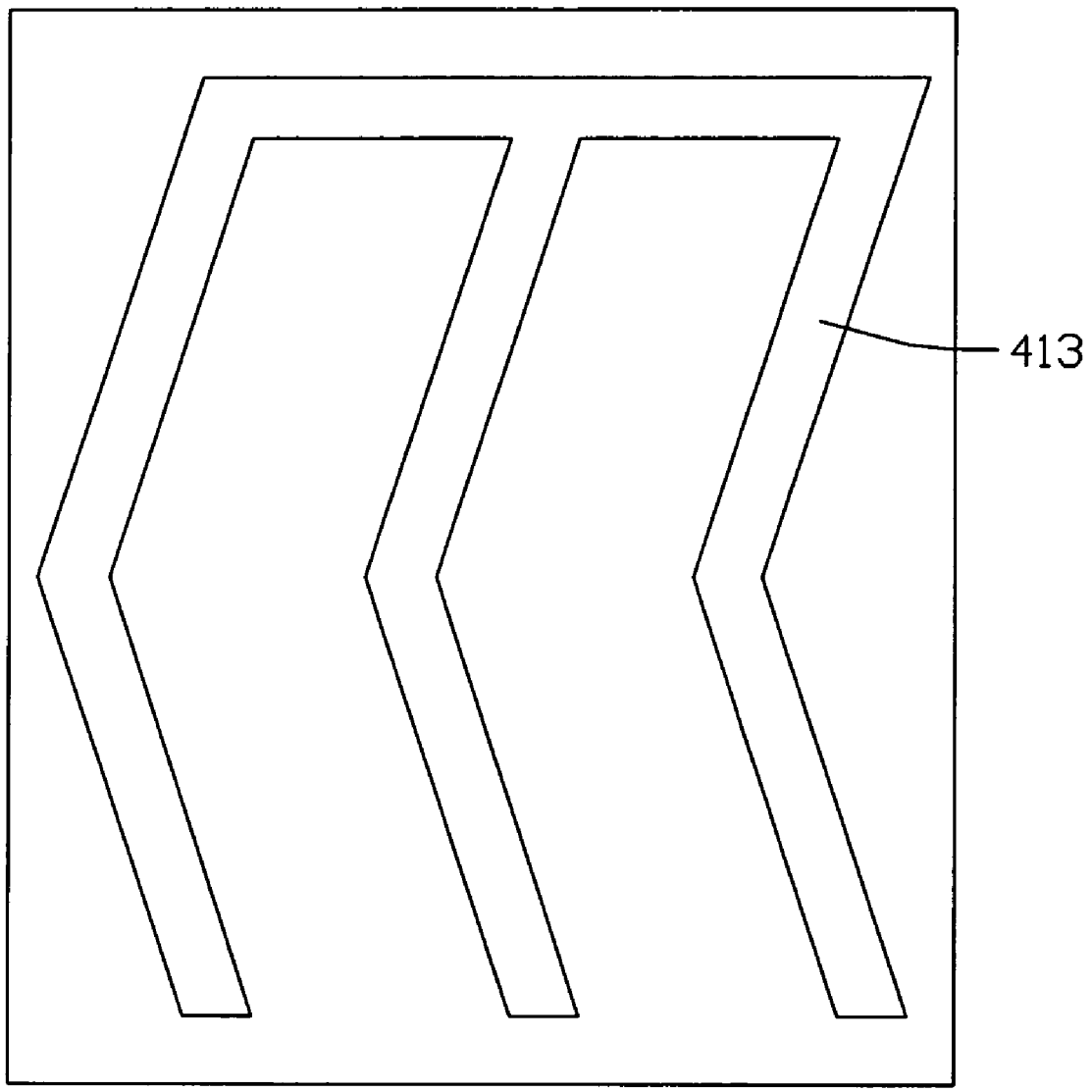
FIG. 7 is similar to FIG. 3, but showing a corresponding view in the case of pixel electrodes and a first common electrode of an FFS LCD according to a third embodiment of the present invention.

FIG. 7 shows pixel electrodes 413 of an LCD according to a third embodiment of the present invention. The pixel electrodes 413 are comb-shaped, and include a plurality of rectilinearly bent or generally zigzag-shaped teeth electrodes extending from a straight bus line.

Figure 8:
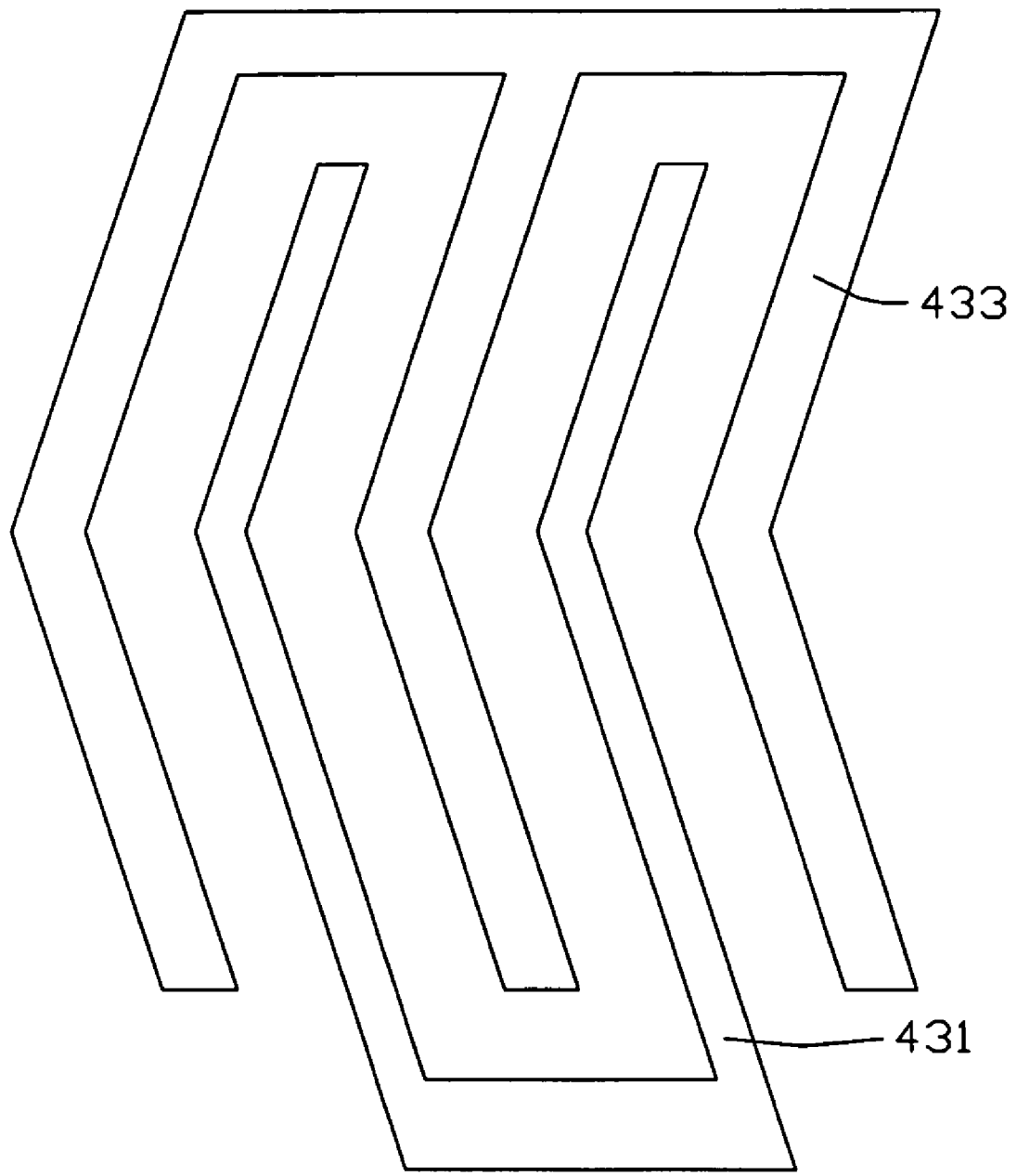
FIG. 8 is similar to FIG. 4, but showing a corresponding view in the case of floating electrodes and second common electrodes of an FFS LCD according to the third embodiment of the present invention.
Figure 9:
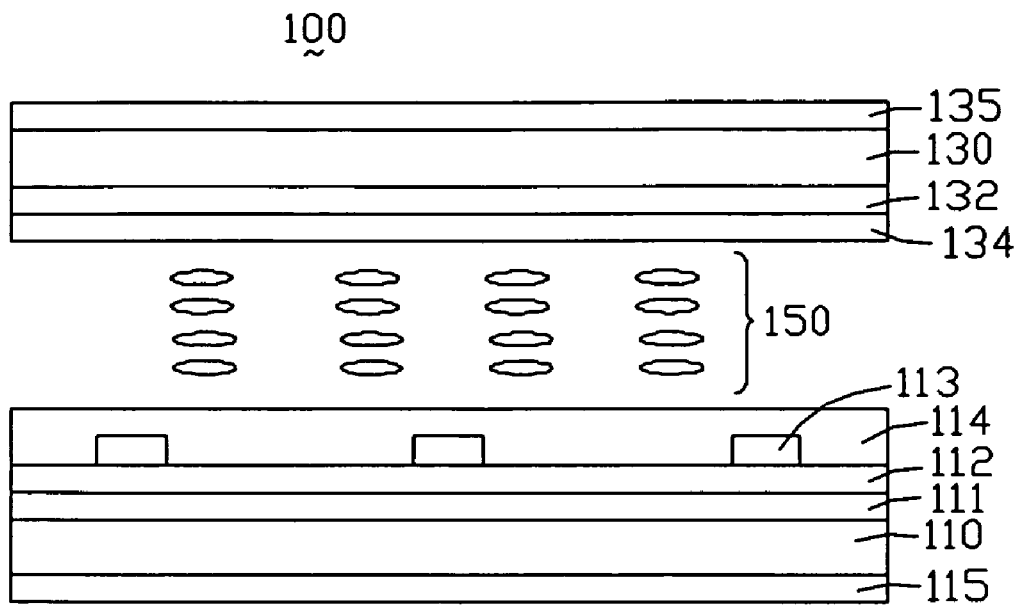
FIG. 9 is a schematic, side cross-sectional view of part of a conventional FFS LCD.
Figure 10:
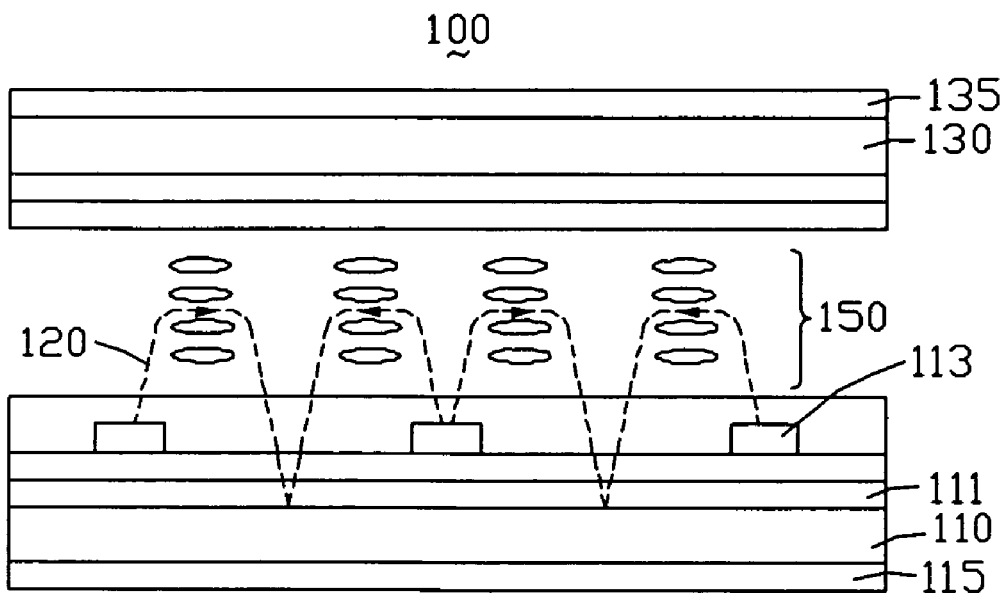
FIG. 10 is similar to FIG. 9, but showing the FFS LCD in an on state.

FIG. 8 shows floating electrodes 433 and second common electrodes 431 of an LCD according to a third embodiment of the present invention. The floating electrodes 433 and the second common electrodes 431 are comb-shaped, and include a plurality of rectilinearly bent or generally zigzag-shaped teeth electrodes extending from a straight bus line.

In an alternative embodiment, the second common electrodes 231 are plane-shaped, and are insulated from the pixel electrodes 233 by a second insulating layer sandwiched therebetween. The liquid crystal layer 230 can include a plurality of liquid crystal molecules having negative dielectric anisotropy, in which case the rubbing directions of the first and second alignment layers 214, 234 need to be adjusted according to the negative dielectric anisotropy characteristic of the liquid crystal molecules.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
    a first substrate;
    a second substrate opposite to the first substrate;
    a liquid crystal layer sandwiched between the first substrate and the second substrate;
    a first common electrode, a plurality of pixel electrodes, and a first insulating layer sandwiched therebetween provided at an inner surface of the first substrate; and
    a plurality of second common electrodes and floating electrodes provided at the second substrate, each floating electrode corresponding to a respective pixel electrode, and being electrically floating, the floating electrodes being made of transparent material;
    wherein each pixel electrode is configured to receive a pixel voltage, the first common electrode and each second common electrode are both configured to receive a common voltage, whereby a first electric field is generated between each pixel electrode and the first common electrode in such a manner that a plurality of electric charges are induced at a surface of the corresponding floating electrode; wherein the induced electric charges and the common voltage applied to each second common electrode cooperatively provide a second electric field, and the second electric field is configured to drive liquid crystal molecules in the liquid crystal layer distal from the first substrate.

2. The liquid crystal display as claimed in claim 1, wherein the second common electrodes and the floating electrodes are formed in the same layer.

3. The liquid crystal display as claimed in claim 2, wherein a first electric field substantially parallel to the first and second substrates is generated between the pixel electrode and the first common electrode, and a second electric field substantially parallel to the first and second substrates is induced to be generated between the second common electrodes and the floating electrodes by the first electric field.

4. The liquid crystal display as claimed in claim 2, wherein the pixel electrodes are comb-shaped.

5. The liquid crystal display as claimed in claim 4, wherein the pixel electrodes include a plurality of striped-shaped first teeth electrodes extending from a straight bus line.

6. The liquid crystal display as claimed in claim 4, wherein the pixel electrodes include a plurality of wavy-shaped first teeth electrodes extending from a straight bus line.

7. The liquid crystal display as claimed in claim 4, wherein the pixel electrodes include a plurality of rectilinearly bent or generally zigzag-shaped first teeth electrodes extending from a straight bus line.

8. The liquid crystal display as claimed in claim 4, wherein the floating electrodes are comb-shaped corresponding to the pixel electrodes.

9. The liquid crystal display as claimed in claim 8, wherein the floating electrodes include a plurality of striped-shaped second teeth electrodes extending from a straight bus line.

10. The liquid crystal display as claimed in claim 8, wherein the floating electrodes include a plurality of wavy-shaped second teeth electrodes extending from a straight bus line.

11. The liquid crystal display as claimed in claim 8, wherein the floating electrodes include a plurality of rectilinearly bent or generally zigzag-shaped second teeth electrodes extending from a straight bus line.

12. The liquid crystal display as claimed in claim 8, wherein the second common electrodes are comb-shaped corresponding to the floating electrodes, the second common electrodes and the floating electrodes being alternately arranged in mesh.

13. The liquid crystal display as claimed in claim 12, wherein the second common electrodes include a plurality of striped-shaped third teeth electrodes extending from a straight bus line.

14. The liquid crystal display as claimed in claim 12, wherein the second common electrodes include a plurality of wavy-shaped third teeth electrodes extending from a straight bus line.

15. The liquid crystal display as claimed in claim 12, wherein the second common electrodes include a plurality of rectilinearly bent or generally zigzag-shaped third teeth electrodes extending from a straight bus line.

16. The liquid crystal display as claimed in claim 1, wherein the pixel electrodes, the first common electrode, the second common electrodes and the floating electrodes are made of transparent material selected from the group consisting of ITO (Indium-Tin Oxide) and IZO (Indium-Zinc Oxide).

17. The liquid crystal display as claimed in claim 1, further comprising a first alignment layer formed on the first substrate facing the liquid crystal layer, and a second alignment layer formed on the second substrate facing the liquid crystal layer.

18. The liquid crystal display as claimed in claim 1, further comprising a color filter on an inner surface of the second substrate, wherein the floating electrodes and the second common electrodes are disposed on an inner surface of the color filter.

19. The liquid crystal display as claimed in claim 1, wherein the second common electrodes are plane-shaped, and are insulated from the floating electrodes by a second insulating layer sandwiched therebetween.

20. A liquid crystal display comprising:
    a first substrate;
    a second substrate opposite to the first substrate;
    a liquid crystal layer sandwiched between the first substrate and the second substrate;
    a first common electrode and a plurality of pixel electrodes configured for generating a first electric field substantially parallel to the first and second substrates; and
    a plurality of second common electrodes and floating electrodes, each floating electrode corresponding to a respective pixel electrode, the floating electrodes being made of transparent material, wherein the floating electrodes are electrically floating, and a plurality of electric charges are induced at a surface of the floating electrodes by the first electric field, the second common electrodes and the floating electrodes are configured for generating a second electric field substantially parallel to the first and second substrates by means of a common voltage applied to the second common electrodes and the induced electric charges at the surface of the floating electrodes.

* * * * *